United States Patent
Duan et al.

(10) Patent No.: US 12,248,400 B2
(45) Date of Patent: Mar. 11, 2025

(54) SYSTEMS AND METHODS FOR MEMORY BANDWIDTH ALLOCATION

(71) Applicant: Alibaba (China) Co., Ltd., Hangzhou (CN)

(72) Inventors: Lide Duan, Sunnyvale, CA (US); Bowen Huang, New Haven, CT (US); Qichen Zhang, Shanghai (CN); Shengcheng Wang, Shanghai (CN); Yen-Kuang Chen, Palo Alto, CA (US); Hongzhong Zheng, Los Gatos, CA (US)

(73) Assignee: Alibaba (China) Co., Ltd., Hangzhou (CN)

( * ) Notice: Subject to any disclaimer, the term of this patent is extended or adjusted under 35 U.S.C. 154(b) by 0 days.

(21) Appl. No.: 18/450,663

(22) Filed: Aug. 16, 2023

(65) Prior Publication Data
US 2024/0061780 A1    Feb. 22, 2024

(30) Foreign Application Priority Data
Aug. 22, 2022   (CN) .......................... 202211008980.0

(51) Int. Cl.
*G06F 12/0811*   (2016.01)
*G06F 12/0846*   (2016.01)

(52) U.S. Cl.
CPC ...... *G06F 12/0811* (2013.01); *G06F 12/0848* (2013.01); *G06F 2212/1021* (2013.01)

(58) Field of Classification Search
CPC ............. G06F 12/0811; G06F 12/0848; G06F 12/0897; G06F 12/084
USPC ............................ 711/118, 122, 12.021, 138
See application file for complete search history.

(56) References Cited

U.S. PATENT DOCUMENTS

| | | | |
|---|---|---|---|
| 9,886,385 B1 * | 2/2018 | Huberty .............. | G06F 12/0897 |
| 10,719,441 B1 * | 7/2020 | Yin ...................... | G06F 12/0802 |
| 2009/0248976 A1 * | 10/2009 | Rotithor ............... | G06F 9/5016 |
| | | | 711/E12.017 |

* cited by examiner

*Primary Examiner* — Gautam Sain
*Assistant Examiner* — Edward Waddy, Jr.
(74) *Attorney, Agent, or Firm* — Finnegan, Henderson, Farabow, Garrett & Dunner, LLP (57) ABSTRACT

A computer-implemented method for allocating memory bandwidth of multiple CPU cores in a server includes: receiving an access request to a last level cache (LLC) shared by the multiple CPU cores in the server, the access request being sent from a core with a private cache holding copies of frequently accessed data from a memory; determining whether the access request is an LLC hit or an LLC miss; and controlling a memory bandwidth controller based on the determination. The memory bandwidth controller performs a memory bandwidth throttling to control a request rate between the private cache and the last level cache. The LLC hit of the access request causes the memory bandwidth throttling initiated by the memory bandwidth controller to be disabled and the LLC miss of the access request causes the memory bandwidth throttling initiated by the memory bandwidth controller to be enabled.

20 Claims, 7 Drawing Sheets

SYSTEMS AND METHODS FOR MEMORY BANDWIDTH ALLOCATION

CROSS-REFERENCE TO RELATED APPLICATIONS

The present application claims priority to and the benefits of Chinese Patent Application No. 202211008980.0, filed on Aug. 22, 2022, which is incorporated herein by reference in its entirety.

TECHNICAL FIELD

The present disclosure generally relates to multi-core processor architectures in computing systems, and, more specifically, to memory bandwidth allocation in multi-core processor architectures.

BACKGROUND

In cloud computing applications, multiple workloads may be co-located on the same server to improve central processing unit (CPU) utilization in modern data centers. In a multi-core processor architecture, several system resources, including a last level cache (LLC) and memory bandwidth, can be shared by different cores of the processor. The LLC refers to a shared highest-level cache being called before accessing a memory to reduce the average cost, such as the processing time, to access data from the memory. In order to optimize the server performance in the data centers and satisfy the workloads having different priorities, the LLC and the memory bandwidth of the system need to be monitored and allocated accurately and efficiently.

SUMMARY

Embodiments of the present disclosure provide a computer-implemented method for allocating memory bandwidth of multiple CPU cores in a server. The method includes: receiving an access request to a last level cache (LLC) shared by the multiple CPU cores in the server, the access request being sent from a core with a private cache holding copies of frequently accessed data from a memory; determining whether the access request is an LLC hit or an LLC miss; and controlling a memory bandwidth controller based on the determination. The memory bandwidth controller performs a memory bandwidth throttling to control a request rate between the private cache and the last level cache. The LLC hit of the access request causes the memory bandwidth throttling initiated by the memory bandwidth controller to be disabled and the LLC miss of the access request causes the memory bandwidth throttling initiated by the memory bandwidth controller to be enabled.

Embodiments of the present disclosure provide an apparatus. The apparatus includes at least one processor comprising: multiple CPU cores, a last level cache shared by the multiple CPU cores, a cache access predictor, and a memory bandwidth controller. The multiple CPU cores comprise corresponding private caches. The last level cache is configured to receive an access request to a last level cache (LLC) being sent from one of the multiple CPU core with the private cache holding copies of frequently accessed data from a memory external to the at least one processor. The cache access predictor is configured to determine whether the access request is an LLC hit or an LLC miss. The memory bandwidth controller is configured to perform memory bandwidth throttling to control a request rate between the private cache and the last level cache. The memory bandwidth controller is further configured to disable the memory bandwidth throttling initiated by the memory bandwidth controller in response to the determination of the access request being the LLC hit, and enable the memory bandwidth throttling initiated by the memory bandwidth controller in response to a determination of the access request being the LLC miss.

Embodiments of the present disclosure provide a non-transitory computer-readable storage medium. The non-transitory computer-readable storage medium stores a set of instructions that are executable by one or more processors of a device to cause the device to perform the method for allocating memory bandwidth mentioned above.

BRIEF DESCRIPTION OF THE DRAWINGS

Embodiments and various aspects of the present disclosure are illustrated in the following detailed description and the accompanying figures. Various features shown in the figures are not drawn to scale.

DETAILED DESCRIPTION OF EXEMPLARY EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms and/or definitions incorporated by reference.

Embodiments described herein solve problems of poor memory bandwidth allocation effectiveness and performance degradation caused by the throttling between a private cache and a shared cache in modern multi-core processor architectures. Existing memory bandwidth allocation techniques typically provide throttling requests entering a last level cache (LLC) to control the memory bandwidth usage. However, throttling LLC accesses is not effective in controlling memory bandwidth usage in the case of an LLC hit. To address this issue, a cache access prediction is proposed to improve the memory bandwidth allocation process by selectively throttling LLC accesses based on the predicted cache access outcome. The cache access prediction can be implemented by different approaches, including various bloom filter-based predictions, machine learning-based predictions, or look-up queries.

Figure 1:
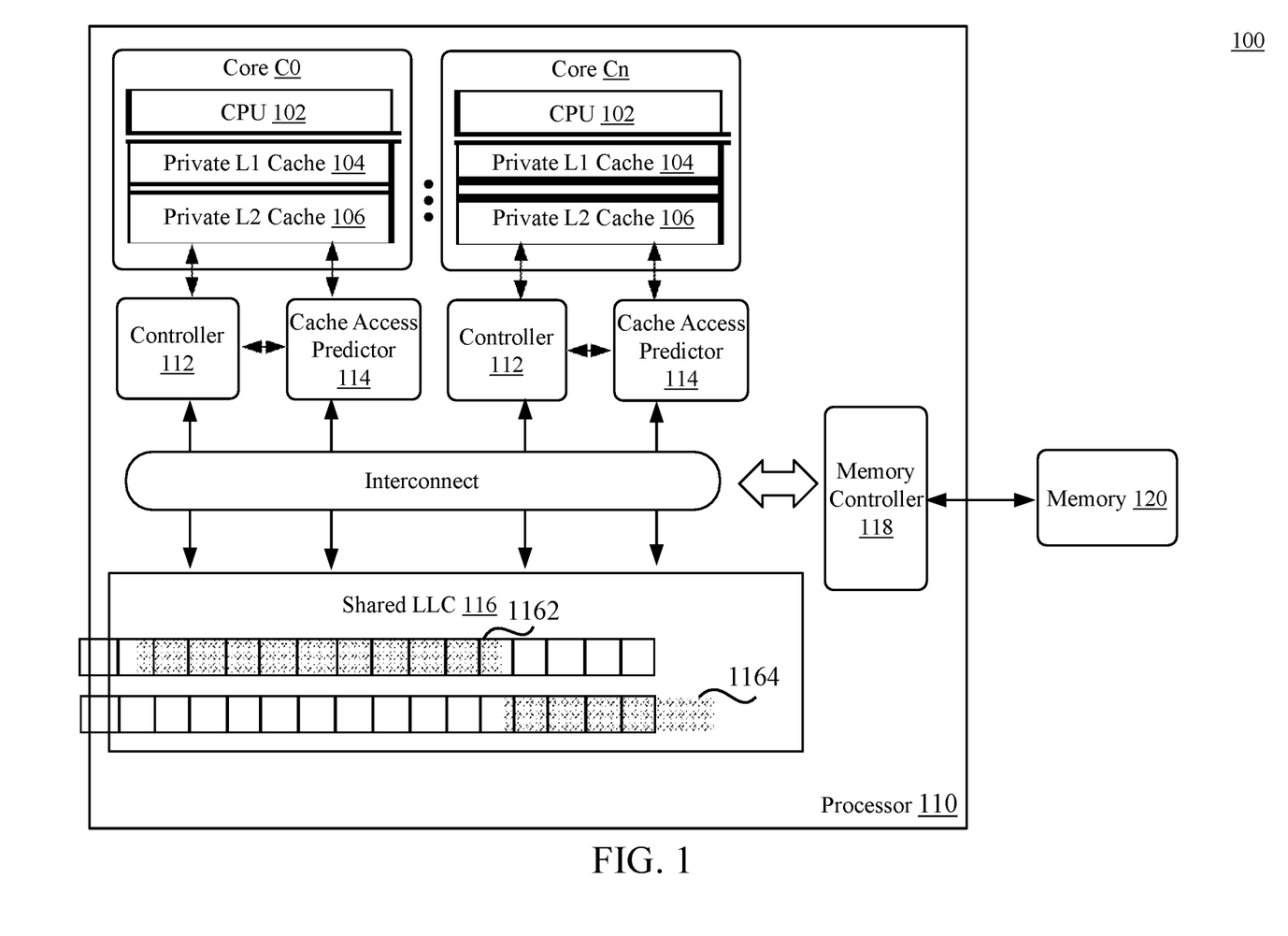
FIG. 1 is a schematic diagram illustrating an exemplary computing system, consistent with some embodiments of the present disclosure.

FIG. 1 is a schematic diagram illustrating an exemplary computing system 100, consistent with some embodiments of the present disclosure. As shown in FIG. 1, computing system 100 includes a multi-core processor 110 and a memory 120 (e.g., a main memory) storing information. The processor 110 includes multiple cores C0-Cn, multiple memory bandwidth controllers 112 respectively associated with the cores C0-Cn, multiple cache access predictors 114 respectively associated with the cores C0-Cn, a last level cache (LLC) 116, and a memory controller 118 integrated in the processor 110 and configured to communicate with the memory 120. In some embodiments, each of the aforementioned components in the processor 110 may communicate with each other via a communication interconnect bus.

In computing system 100, caching is employed to reduce the performance penalty. More specifically, processor 110 employs internal memory known as hardware caches for holding copies of frequently accessed data from the external memory 120, so that the data can be accessed faster than the data retrieved from the memory 120. The processor 110 (or other data element) containing the hardware cache determines what data to retain in the hardware cache and also determines what retained data to remove.

As shown in FIG. 1, the processor 110 has several layers of hardware caches (e.g., multi-level caches), which form a cache hierarchy. In some embodiments, each core C0-Cn includes a processing unit 102 (e.g., a CPU), and one or more layers of private caches, for example, a level one (L1) cache 104 and a level two (L2) cache 106. Cores C0-Cn may store data to be accessed in respective caches to speed up CPU core processing. To reduce cache redundancy, the processor 110 may provide the LLC 116, which is a shared cache shared by cores C0-Cn, to reduce communication delays and data redundancies and to enhance cache space usage efficiency.

In the example shown in FIG. 1, the L1 caches 104 are the hardware caches located closest to the processor register (i.e., located at the top of the cache hierarchy), the L2 caches 106 are the next closest, and so on. The L1 caches 104 may be faster but have smaller storage capacity compared to the L2 caches 106. On the other hand, the L2 caches 106 may be slower but have a larger storage capacity. In operation, when the processing unit 102 accesses data, the processing unit 102 accesses the L1 cache 104 first. If the L1 cache 104 does not contain the required reference, the processing unit 102 accesses the L2 cache 106. If the L2 cache 106 does not contain the required reference either, the shared LLC 116, which is a level three (L3) cache in the embodiments of FIG. 1, may be accessed before the processor 110 retrieves data from the memory 120 via the memory controller 118.

In data centers, multiple workloads may be co-located on the same server, and resources that are shared between co-located workloads, e.g., CPU cores, the shared LLC 116, and the memory bandwidth, are isolated. Accordingly, the processor 110 needs to achieve accurate and efficient allocations and reallocations of shared resources, including CPU cores, the shared LLC 116, and the memory bandwidth. Particularly, the co-located workloads may include Latency Critical (LC) workloads and Best Effort (BE) workloads. For Latency Critical workloads, Service Level Objectives (SLOs) within a Service Level Agreement need to be satisfied. For example, a Service Level Objective may include one or more performance target metrics, such as a response time or a throughput. Accordingly, to optimize the server performance, the server improves the throughput of the BE workloads, without violating the SLOs of the LC workloads. For example, the server may temporarily allocate free resources for the BE workloads. When the LC workloads become demanding and are about to violate the SLOs, the server may reallocate the shared resources to the LC workloads.

For example, in some embodiments, the LLC 116 may support cache allocation and provide cache space 1162 available to high priority applications and cache space 1164 available to low priority applications. For example, a Class of Service (CLOS) may be introduced in cache allocation to enables flexible control over threads, applications, virtual machines (VMs), or containers. The CLOS acts as a resource control tag into which threads, applications, VMs, and/or containers can be grouped, and has associated resource capacity bitmasks (CBMs) indicating the amount of last level cache available to the given CLOS.

Memory bandwidth controllers 112 are configured to provide per-core controls over bandwidth. Specifically, memory bandwidth controllers 112 may perform a request rate control (e.g., "throttling") between the private cache (e.g., L2 caches 106) and the shared cache (e.g., the LLC 116) to achieve memory bandwidth allocation by applying different delay values.

Figure 2:
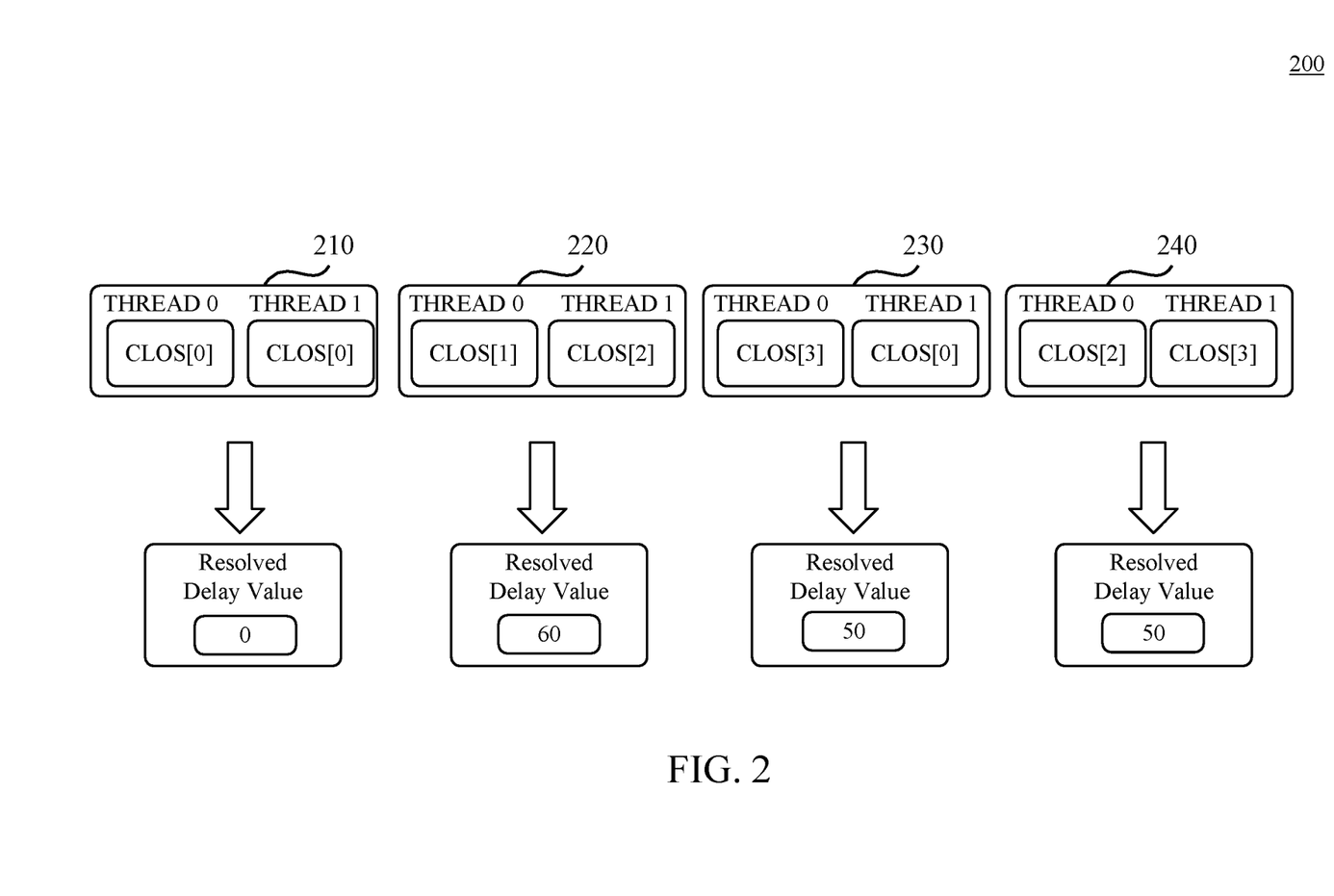
FIG. 2 is a diagram illustrating a memory bandwidth allocation process, consistent with some embodiments of the present disclosure.

FIG. 2 is a diagram illustrating a memory bandwidth allocation process 200, consistent with some embodiments of the present disclosure. In some embodiments, the CLOS also enables running threads, applications or VMs to be mapped to a corresponding memory bandwidth setting. As shown in FIG. 2, the memory bandwidth controllers 112 associated with multiple cores may respectively apply corresponding delay values to threads running on the cores.

For example, for two running threads thread0 and thread1 on the core 210, both thread0 and thread1 are mapped into a first CLOS (e.g., CLOS[0]) with a first delay value (e.g., 0), the applied delay value will be the first delay value. For two running threads thread0 and thread1 on the core 220, thread0 is mapped into a second CLOS (e.g., CLOS[1]) with a second delay value (e.g., 60), while thread1 is mapped into a third CLOS (e.g., CLOS[2]) with a third delay value (e.g., 50), the applied delay value will be the greater one of the second and third delay values (e.g., 60), to ensure an optimized control over "noisy neighbor" threads, which refer to bandwidth-intense applications in the data center environment. Similarly, for two running threads thread0 and thread1 on the core 230, thread0 is mapped into a fourth CLOS (e.g., CLOS[3]) with a fourth delay value (e.g., 50), while thread1 is mapped into the first CLOS (e.g., CLOS [0]), the applied delay value will be the greater one of the first and fourth delay values, which is the fourth delay value. Similarly, for two running threads thread0 and thread1 on the core 240, thread0 is mapped into the third CLOS (e.g., CLOS[2]), while thread1 is mapped into the fourth CLOS (e.g., CLOS[3]). As shown in the core 240, different CLOSs may correspond to the same delay value. For example, in the present embodiment, the third delay value and the fourth delay value are both 50.

It is noted that, the delay values described herein may be regarded as a hint from software to hardware regarding how much throttling should be applied. Particularly, bandwidth limits per-CLOS may be specified as a value in the range of zero to a maximum supported throttling level for the platform, which may be up to approximately 90% throttling and approximately in 10% steps. These steps may be approximate and represent a calibrated value, and the resulting bandwidth may vary across system configurations, generations and memory configurations.

In some embodiments, by the memory bandwidth allocation described above, memory bandwidth controllers 112 control the request rate and delay accesses to the LLC 116, which may result in performance penalty in certain scenarios, because the delayed accesses to the LLC 116 also throttle hits in the LLC 116. In addition, for the LLC access being a hit, the memory bandwidth usage is not affected by the throttling.

Referring again to FIG. 1, the cache access predictors 114 respectively associated with the cores CO-Cn are configured to predict whether an access request sent from the corresponding core CO-Cn is an LLC hit or an LLC miss. In various embodiments, the cache access predictors 114 may predict the access request to be the LLC hit or LLC miss based on one or more input data associated with the access request, such as a requested memory line address, a request type, a data size, a source identifier (source ID), a destination identifier (destination ID), or any combination thereof.

The cache access predictor 114 may further enable or disable the memory bandwidth allocation function according to the prediction result. For example, when the cache access predictor 114 associated with the core CO predicts that the access request from the core CO is an LLC hit, the cache access predictor 114 may disable memory bandwidth throttling initiated by the memory bandwidth controller 112 associated with the core CO. Because the accesses to the LLC 116 are not throttled, the performance degradation due to memory bandwidth usage throttling can be reduced or avoided. In other words, when an LLC hit is predicted, the throttling request sent from the memory bandwidth controller 112 can be ignored and disregarded for cases where throttling is not needed, because the requested data can be likely accessed from the LLC 116 without accessing the memory 120 and consuming memory bandwidth.

On the other hand, when the cache access predictor 114 associated with the core CO predicts that the access request from the core CO is an LLC miss, the cache access predictor 114 may enable memory bandwidth throttling initiated by the memory bandwidth controller 112 associated with the core CO. Accordingly, the memory bandwidth allocation for high priority processor cores and low priority processor cores can be achieved by the throttling of processor cores using different delay settings. In other words, when an LLC miss is predicted, the corresponding core responds to the throttling request sent from the memory bandwidth controller 112 to control memory bandwidth usage.

Figure 3:
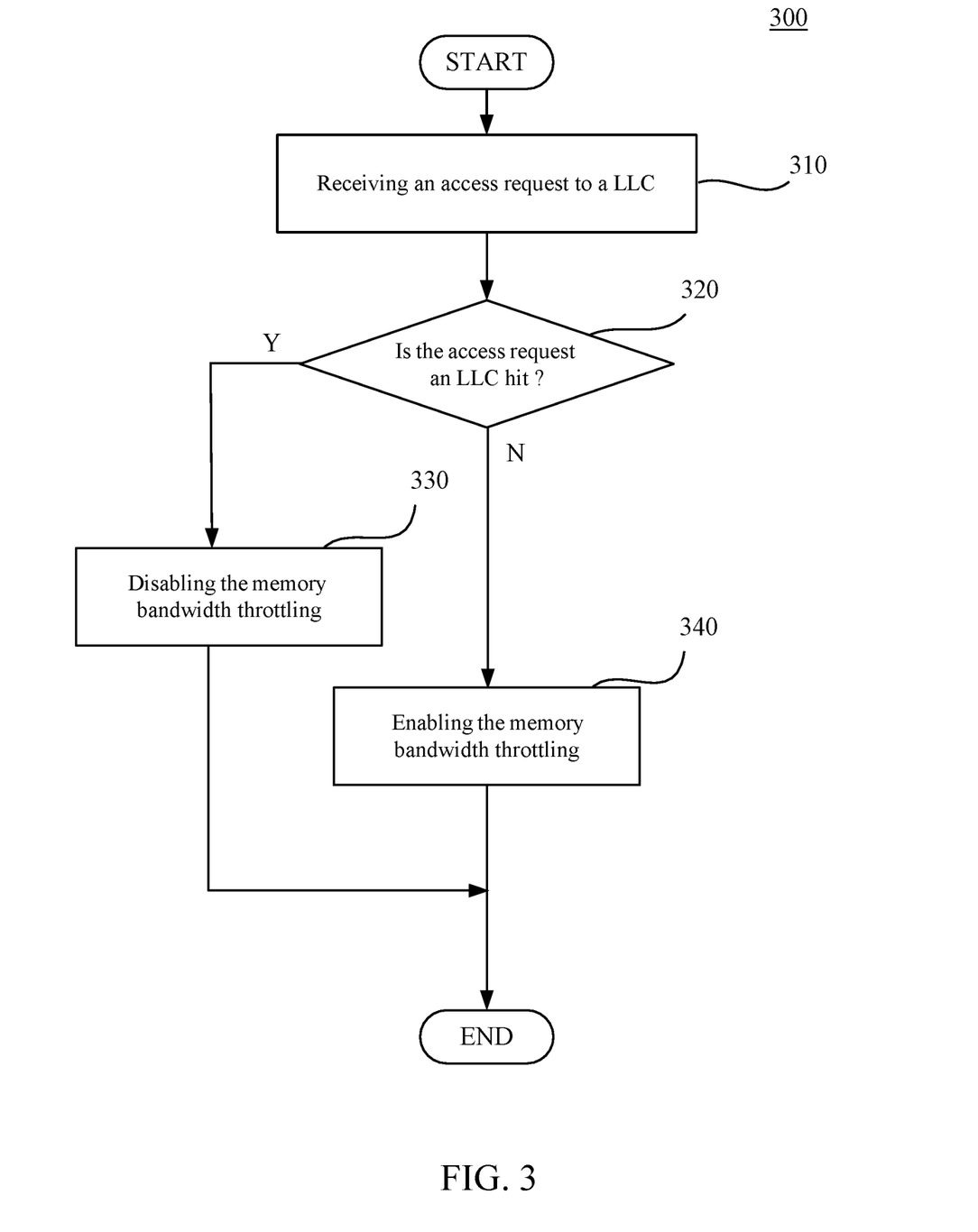
FIG. 3 illustrates a flowchart of an exemplary computer-implemented method for allocating memory bandwidth, consistent with some embodiments of the present disclosure.

FIG. 3 illustrates a flowchart of an exemplary computer-implemented method 300 for allocating memory bandwidth, consistent with some embodiments of the present disclosure. Method 300 may be performed by computing system 100 shown in FIG. 1, either alone or with other systems. Referring to FIG. 3, the method 300 includes the following steps 310, 320, 330, and 340.

At step 310, a cache access predictor (e.g., cache access predictor 114 in FIG. 1) receives an access request to an LLC (e.g., LLC 116 in FIG. 1) from a core (e.g., any one of cores CO-Cn in FIG. 1), which is shared by multiple CPU cores in the server, with a private cache (e.g., L2 cache 106 in FIG. 1). In some embodiments, the corresponding core sends the access request when an L1 miss and an L2 miss occur after accessing the private cache(s) assigned to the core.

At step 320, the cache access predictor determines whether the access request is an LLC hit or an LLC miss. Specifically, in some embodiments, the cache access predictor makes a prediction of the LLC hit/miss status of the access request. In various embodiments, the cache access predictor may be implemented using different designs, which will be discussed in detail in embodiments of FIGS. 4-7 in the following paragraphs. It is noted that the cache access predictors shown in FIGS. 4-7 are merely examples and not meant to limit the present disclosure.

Figure 4:
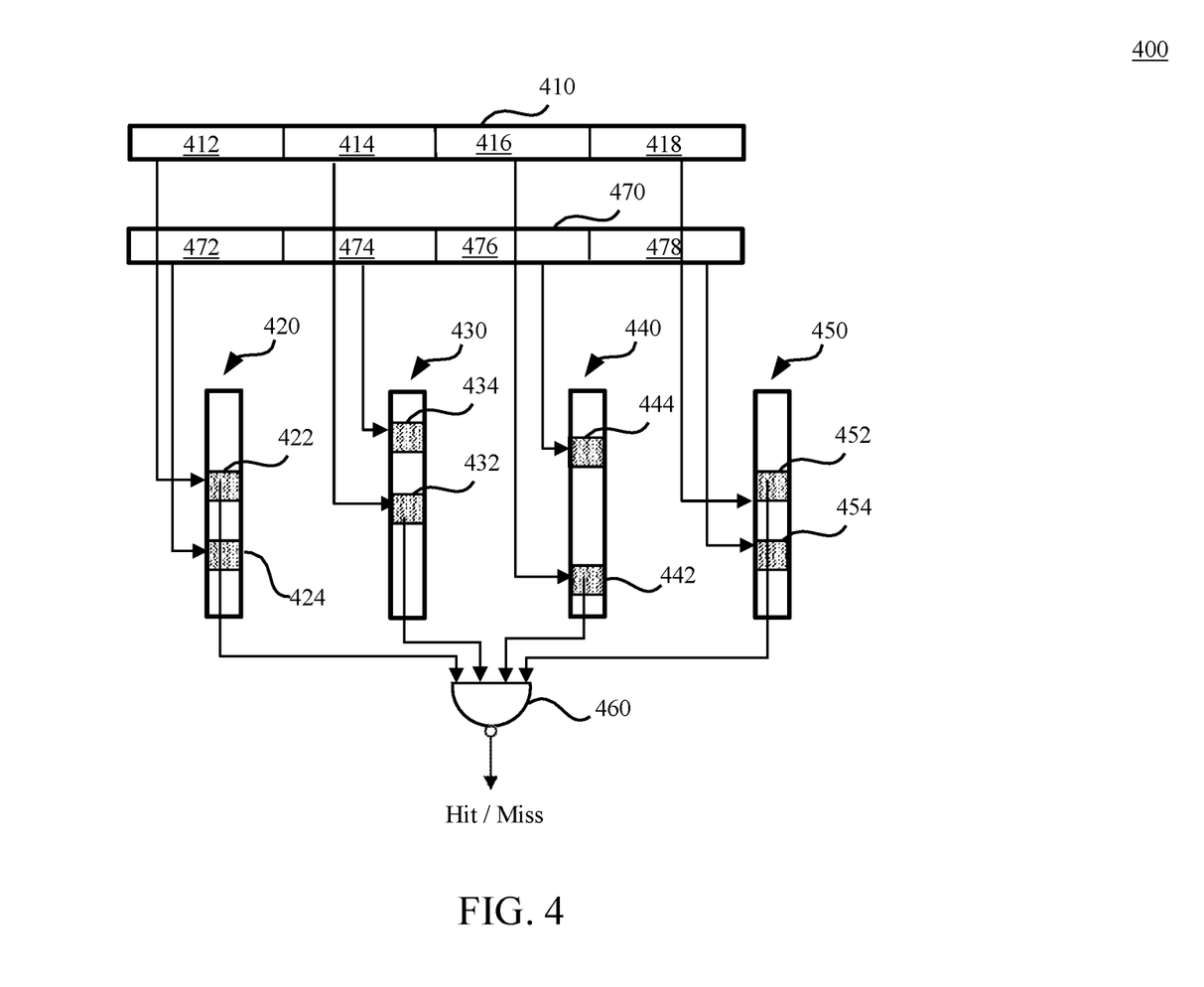
FIG. 4 is a diagram illustrating an exemplary cache access predictor, consistent with some embodiments of the present disclosure.

In some embodiments, step 320 can be performed by a Partitioned-Address Bloom Filter Predictor. FIG. 4 is a diagram illustrating an exemplary cache access predictor 400, consistent with some embodiments of the present disclosure. When receiving an access request, the cache access predictor 400 splits the requested memory line address 410 with n bits associated with the access request into m partitioned addresses 412, 414, 416, and 418. Partitioned addresses 412, 414, 416, and 418 are respectively used to index corresponding bloom filter arrays 420, 430, 440, and 450.

As used herein, a bloom filter may refer to an approximate encoding of a set of items or keys using a bit array, such as an array data structure that compactly stores bits. When the array is initiated, each bit is set to an initial value of 0. To insert an item into the bit array, the item is hashed to a number between 1 and b, b being the number of bits held by the bit vector. The results of the hash functions correspond to addresses in the bit array, which are then set to 1.

To check if an item is in the bloom filter, the item is hashed the same number of times as the items inserted into the bloom filter. For example, if each inserted item was hashed b times, the item being checked is hashed b times. The addresses corresponding to the hash results are checked and if any of the hash functions points to a 0 bit, then the item is not in the set, with 100% certainty. However, if a hash function points to a 1 bit, then either: i) the item is present in the bloom filter; or ii) the hashed value of this item collided with the hash value of some other item that is in the bloom filter. Because of hash collisions, a bloom filter can produce false positives, i.e., the item is falsely reported as being in the bloom filter. However, a bloom filter does not produce false negatives, i.e., the item is in the bloom filter, but its presence is not reported.

To reduce the frequency of false positives, the number of hashes used by the bloom filter may be increased, such that the greater the number of hash functions, the lower the rate of false positives. However, as the number of hash functions increases, the process to set and check items in the bloom filter becomes more computationally costly. One method of accelerating setting and checking operations may be to execute operations in parallel. However, CPUs operate on bits, which results in a bucketing problem, for example, when multiple bits need to be operated on but the multiple bits belong to the same byte. Thus, when run in parallel, operations may encounter read/write issues.

In the embodiments of FIG. 4, the bloom filter technique can be employed for predicting cache misses or hits. In some embodiments, bloom filter arrays 420, 430, 440, and 450 may be counting bloom filters, which provide multibit counters (e.g., k-bit saturating counters) for tracking addresses added to and removed from a cache. When a new line is added in the cache, the counters corresponding to the hashes for the address are incremented. When a cache replacement occurs, the corresponding counters are decremented. Accordingly, the counter being zero indicates that the corresponding address was not in the cache. On the other hand, the counter being greater than one indicates that the address may have been encountered.

Particularly, the cache access predictor 400 can respectively map the partitioned addresses 412, 414, 416, and 418 to corresponding entries (e.g., entries 422, 432, 442, and 452) in the bloom filter arrays 420, 430, 440, and 450. Each entry indicates a number of cache lines in the LLC 116 including the partitioned address associated with the entry. Accordingly, if one or more of the bloom filter arrays 420, 430, 440, and 450 indicate one or more of the partitioned addresses 412, 414, 416, and 418 being absent in the LLC 116 (e.g., one or more inputs of NAND logic 460 being 0), the requested memory line address 410 is not in the LLC 116, which indicates an LLC miss (e.g., output of NAND logic 460 being 1).

On the other hand, if the bloom filter arrays 420, 430, 440, and 450 indicate that each of the partitioned addresses 412, 414, 416, and 418 matches one or more lines in the LLC 116 (e.g., all inputs of NAND logic 460 being 1), the requested memory line address 410 is predicted to be in the LLC 116. Accordingly, the cache access predictor 400 predicts an LLC hit (e.g., output of NAND logic 460 being 0). Alternatively stated, in response to one or more of the partitioned addresses 412, 414, 416, and 418 being mapped to one or more entries with a zero value, the cache access predictor 400 determines the access request to be an LLC miss. Otherwise, in response to the partitioned addresses 412, 414, 416, and 418 each being mapped to an entry with a non-zero value, the cache access predictor 400 predicts the access request to be an LLC hit. It is noted that the LLC hit prediction may be a false prediction due to a filter error when a cache miss is not identified. For example, it is possible that all m partitioned addresses 412, 414, 416, and 418 match address partitions of other cache lines in the LLC 116, but the requested memory line address 410 is not in the LLC 116.

In response to the determination of the access request being the LLC miss, the cache access predictor 400 updates the entries in the bloom filter arrays 420, 430, 440, and 450 accordingly. Particularly, the cache access predictor 400 may increment entries 422, 432, 442, and 452 in the bloom filter arrays 420, 430, 440, and 450, because entries 422, 432, 442, and 452 are associated with the partitioned addresses 412, 414, 416, and 418 of the requested memory line address 410 to be newly added to the LLC 116. In addition, because a replaced memory line address 470 will be replaced by the requested memory line address 410, the cache access predictor 400 further decrements corresponding entries 424, 434, 444, and 454 in the bloom filter arrays 420, 430, 440, and 450. The entries 424, 434, 444, and 454 are respectively associated with partitioned addresses 472, 474, 476, and 478 of the replaced memory line address 470.

Accordingly, the cache access predictor 400 shown in FIG. 4 can perform the LLC hit/miss prediction/determination in step 320 by splitting the requested memory line address 410, respectively mapping the partitioned addresses 412, 414, 416, and 418 to corresponding entries in the bloom filter arrays 420, 430, 440, and 450. When one or more of the partitioned addresses 412, 414, 416, and 418 are mapped to the entry with a zero value, the cache access predictor 400 determines the access request to be a miss in the LLC. When the partitioned addresses 412, 414, 416, and 418 are mapped to the non-zero entries, the cache access predictor 400 predicts the access request to be a hit in the LLC.

Figure 5:
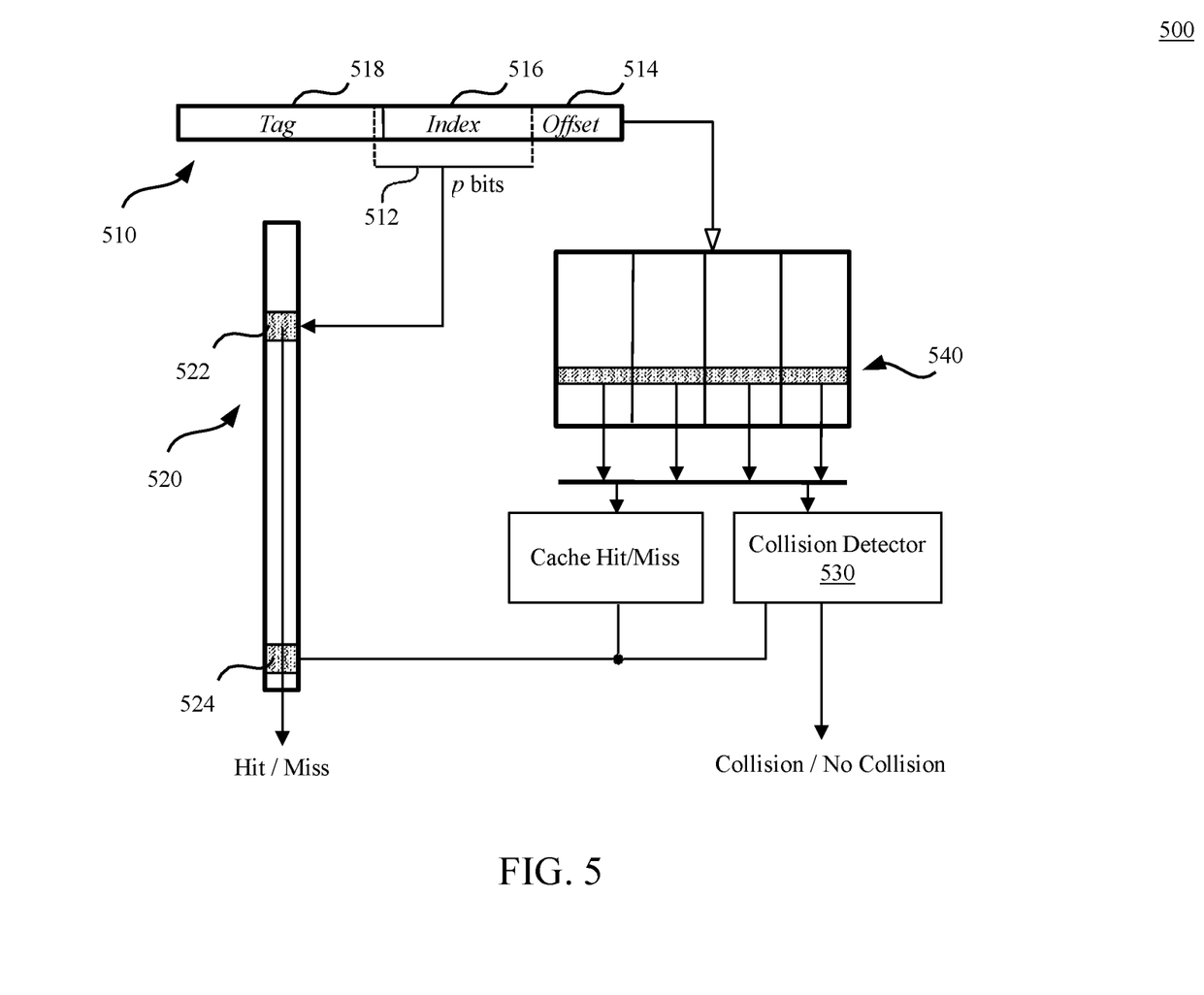
FIG. 5 is a diagram illustrating another exemplary cache access predictor, consistent with some embodiments of the present disclosure.

Referring again to FIG. 3, in some other embodiments, step 320 can be performed by a Partial-Address Bloom Filter Predictor. FIG. 5 is a diagram illustrating another exemplary cache access predictor 500, consistent with some embodiments of the present disclosure. When receiving an access request, the cache access predictor 500 obtains a partial address 512 from a requested memory line address 510 associated with the access request. As shown in FIG. 5, one requested memory line address 510 includes an offset part 514, a set index part 516, and a tag part 518 containing the most significant bits of the address. In some embodiments, the partial address 512 may include least-significant p bits of the requested memory line address 510, and the length of the partial address 512 is greater than or equal to the set index part 516. That is, p is greater than or equal to the number of index bits in the requested memory line address.

Similar to the example of FIG. 4, the partial address 512 may be used to index a bloom filter array 520. Particularly, the cache access predictor 500 may map the partial address 512 to a corresponding bit 522 in the bloom filter array 520. Each bit in the bloom filter array 520 indicates whether a partial address matches any cache line in the LLC 116. Accordingly, in response to the corresponding bit 522 being set to true, the cache access predictor 500 may predict the received access request to be an LLC hit. Otherwise, the cache access predictor 500 may determine the access request to be an LLC miss, in response to the corresponding bit 522 being reset to false.

In response to the determination of the access request being the LLC miss, the cache access predictor 500 also updates the entries in the bloom filter array 520 accordingly. Particularly, the cache access predictor 500 may set the corresponding bit 522 to be true, given that the bit 522 is associated with the partial address 512 of the requested memory line address 510 to be newly added to the LLC 116. In addition, when a memory line address in the LLC 116 is replaced, a collision detector 530 may check the remaining cache lines 540 in the same set. If one or more remaining cache lines have the same partial address as the replaced memory line address, the corresponding bloom filter bit 524 is not reset. Otherwise, the corresponding bloom filter bit 524 is reset to false. In some embodiments, the collision detection may be performed in parallel with the cache hit/miss prediction.

Accordingly, the cache access predictor 500 shown in FIG. 5 can perform the LLC hit/miss prediction/determination in step 320 by obtaining the partial address 512 from the requested memory line address 510 and mapping the partial address 512 to the corresponding bit in the bloom filter array 520. When the corresponding bit is reset to false, the cache access predictor 500 determines the access request to be a miss in the LLC. On the other hand, when the corresponding bit is set to true, the cache access predictor 500 predicts the access request to be a hit in the LLC.

Figure 6:
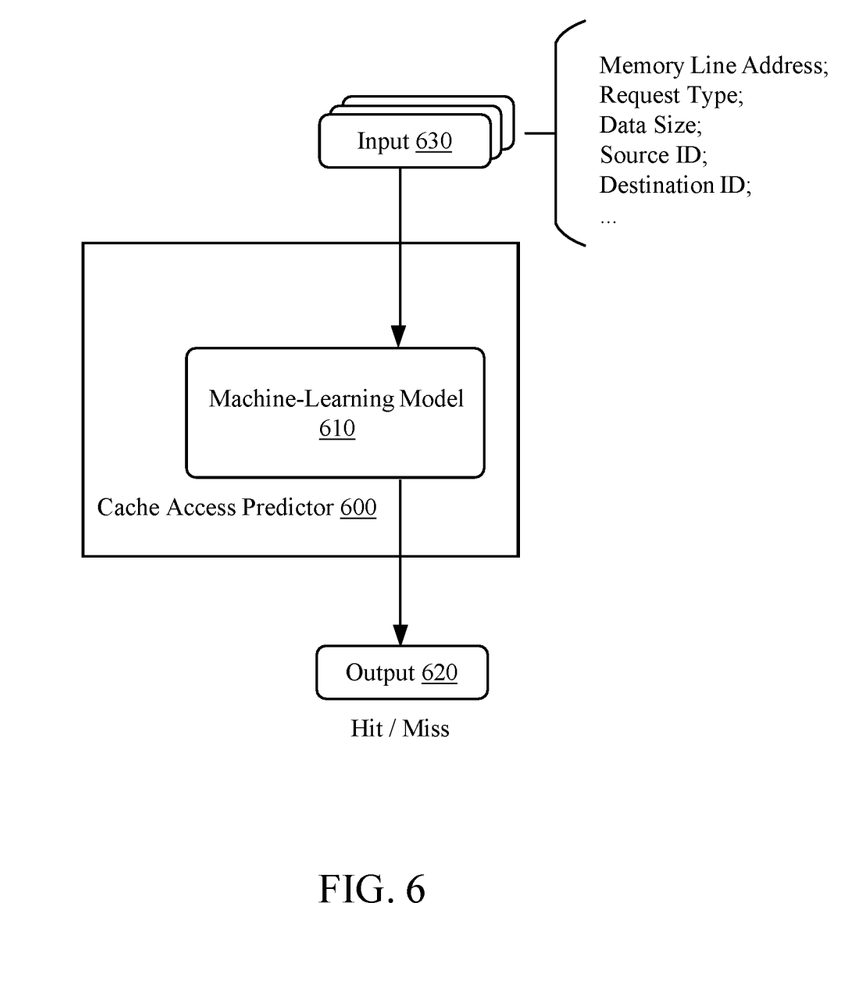
FIG. 6 is a diagram illustrating another exemplary cache access predictor, consistent with some embodiments of the present disclosure.

Referring again to FIG. 3, in some other embodiments, step 320 can be performed by a Machine Learning-Based Predictor. FIG. 6 is a diagram illustrating another exemplary cache access predictor 600, consistent with some embodiments of the present disclosure. Instead of using bloom filter(s) for the cache hit/miss prediction, the cache access predictor 600 may apply a previously trained machine-learning model 610 to implement a machine-learning-based predictor, utilizing a machine learning process for making decisions to evaluate the cache hit/miss status. In various embodiments of the present disclosure, different machine learning algorithms may be used and implemented, and trained using different training data. In some embodiments, the machine-learning-based cache access predictor 600 may provide a prediction output 620 indicating the LLC hit/miss status based on one or more inputs 630, such as a requested memory line address, a request type, a data size, a source ID, a destination ID, or any combination thereof.

Figure 7:
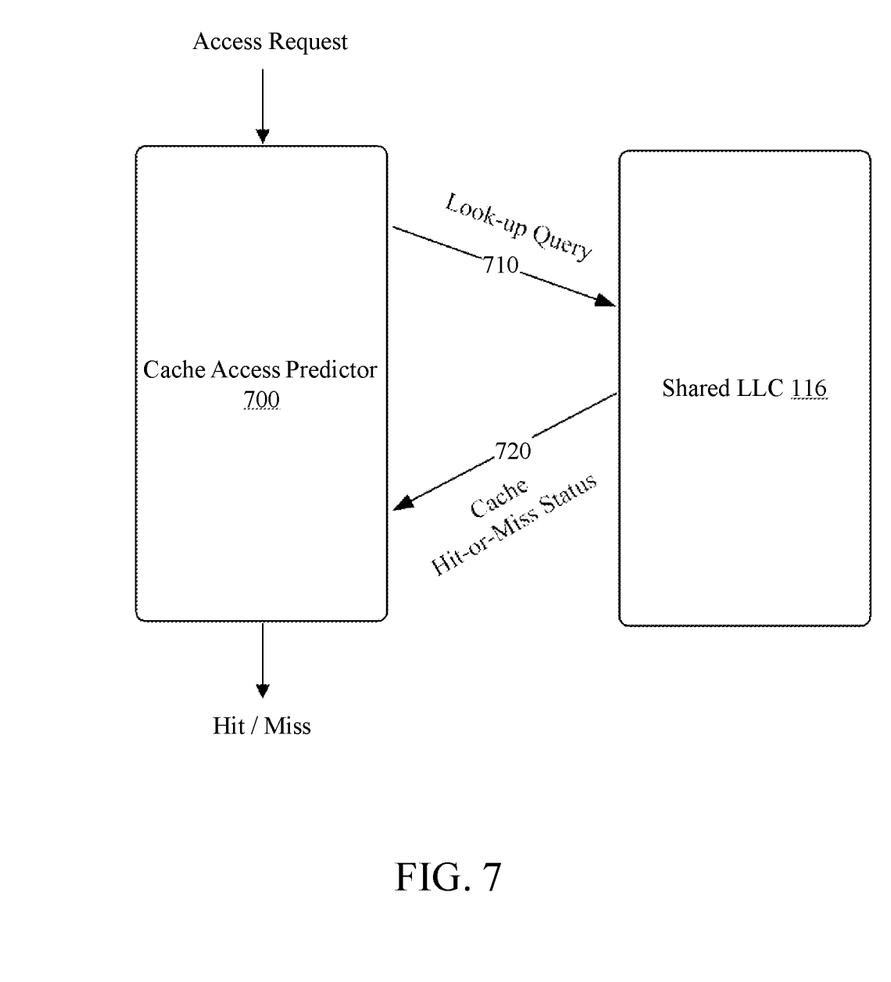
FIG. 7 is a diagram illustrating another exemplary cache access predictor, consistent with some embodiments of the present disclosure.

Referring again to FIG. 3, in some other embodiments, step 320 can be performed by a cache access predictor sending queries to the LLC to look up whether a hit or a miss will occur in the LLC. FIG. 7 is a diagram illustrating another exemplary cache access predictor 700, consistent with some embodiments of the present disclosure. The cache access predictor 700 is configured to send a query 710 to the LLC 116 according to the access request. The query 710 may be a look-up query for checking whether an L2 miss request will hit or miss in the LLC 116. In response to the query 710, the LLC 116 returns a cache hit-or-miss status 720 back to the cache access predictor 700. The cache access predictor 700, after receiving the cache hit-or-miss status 720 returned from the LLC 116, is configured to determine whether the access request is an LLC hit or an LLC miss based on the received cache hit-or-miss status 720.

In some embodiments, the query 710 is configured to only look up the LLC 116 to determine the hit/miss status of an access, and data will not be returned even if the cache hit-or-miss status 720 indicates that it is a hit in the LLC 116. Accordingly, compared to normal accesses, the response time for the query 710 is shorter, which allows the cache access predictor 700 to efficiently disable the memory bandwidth throttling when the cache hit-or-miss status 720 indicates an LLC hit.

Referring again to FIG. 3, after the cache access predictor determines or predicts whether the access request will be a hit or a miss in the LLC, at steps 330 and 340, the cache access predictor controls a memory bandwidth controller based on the determination, and selectively disables a memory bandwidth throttling or allows the memory bandwidth controller to perform the memory bandwidth throttling. The LLC hit of the access request causes the memory bandwidth throttling initiated by the memory bandwidth controller to be disabled. On the other hand, the LLC miss of the access request causes the memory bandwidth throttling initiated by the memory bandwidth controller to be enabled.

Particularly, in response to a determination of the access request being the LLC hit (step 320—yes), at step 330, the cache access predictor disables the memory bandwidth throttling initiated by a memory bandwidth controller (e.g., memory bandwidth controller 112 in FIG. 1). Accordingly, the overall system performance can be improved by avoiding unnecessary over-throttling when the LLC hit occurs.

In response to a determination of the access request being the LLC miss (step 320—no), at step 340, the cache access predictor enables the memory bandwidth throttling initiated by the corresponding memory bandwidth controller. The memory bandwidth controller then performs the memory bandwidth throttling to control a request rate between the private cache and the last level cache. In other words, the corresponding memory bandwidth controller may continue to perform the memory bandwidth allocation by setting and updating delay values dynamically for the request rate control, to ensure that sufficient memory bandwidth is available for high-priority workloads.

In view of the above, as proposed in various embodiments of the present disclosure, a cost-effective and simple design is provided to achieve efficient memory bandwidth usage control and allocation by selectively enabling or disabling the dynamic memory bandwidth throttling based on a predicted hit/miss in a shared cache within the multi-core processor architecture. In addition, undesired performance degradation caused by the memory bandwidth usage throttling can be avoided or reduced. The methods and systems described herein can be applied to any level of cache or memory subsystem in a computing system. In addition, the methods and systems described herein are independent of instruction set architecture (ISA), and thus can be applied to different CPU designs and architectures with different ISAs, such as Arm, RISC-V, etc.

The various example embodiments described herein can include aspects performed by computer program product, embodied in a computer-readable medium, including computer-executable instructions, such as program code, executed by computers in networked environments. A computer-readable medium may include removeable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. The computer-readable medium can be a tangible and non-transitory computer readable medium. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words are not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above-described embodiments can be implemented by hardware, or software (program codes), or a combination of hardware and software. If implemented by software, it may be stored in the above-described computer-readable media. The software, when executed by the processor, can perform the disclosed methods. The computing units and other functional units described in the present disclosure can be implemented by hardware, or software, or a combination of hardware and software. One of ordinary skill in the art will also understand that multiple ones of the above-described modules/units may be combined as one module/unit, and each of the above-described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the disclosure disclosed herein. It is intended that the specification and examples be considered as exemplary only, with a true scope and spirit of the disclosure being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

The embodiments may further be described using the following clauses:

1. A computer-implemented method for allocating memory bandwidth of multiple CPU cores in a server, comprising:
receiving an access request to a last level cache (LLC) shared by the multiple CPU cores in the server, the access request being sent from a core with a private cache holding copies of frequently accessed data from a memory;
determining whether the access request is an LLC hit or an LLC miss; and
controlling a memory bandwidth controller based on the determination, wherein the memory bandwidth controller performs a memory bandwidth throttling to control a request rate between the private cache and the last level cache, and the LLC hit of the access request causes the memory bandwidth throttling initiated by the memory bandwidth controller to be disabled and the LLC miss of the access request causes the memory bandwidth throttling initiated by the memory bandwidth controller to be enabled.

2. The computer-implemented method of clause 1, wherein determining whether the access request is the LLC hit or the LLC miss comprises:
determining whether the access request is the LLC hit or the LLC miss based on a requested memory line address associated with the access request, a request type associated with the access request, a data size associated with the access request, a source identifier associated with the access request, a destination identifier associated with the access request, or any combination thereof.

3. The computer-implemented method of clause 1 or clause 2, wherein determining whether the access request is the LLC hit or the LLC miss comprises:
splitting a requested memory line address associated with the access request into a plurality of partitioned addresses;
respectively mapping the plurality of partitioned addresses to corresponding entries in a plurality of bloom filter arrays, wherein each entry indicates a number of cache lines in the LLC including a corresponding partitioned address associated with the entry; and
in response to one or more of the partitioned addresses being mapped to the entry with a zero value, determining the access request to be the LLC miss; otherwise, determining the access request to be the LLC hit.

4. The computer-implemented method of clause 3, further comprising:
in response to a determination of the access request being the LLC miss:
incrementing first entries in the bloom filter arrays, the first entries being associated with the partitioned addresses of the requested memory line address to be added to the LLC; and
decrementing second entries in the bloom filter arrays, the second entries being associated with second partitioned addresses of a replaced memory line address to be replaced by the requested memory line address.

5. The computer-implemented method of clause 1 or clause 2, wherein determining whether the access request is the LLC hit or the LLC miss comprises:
obtaining a partial address from a requested memory line address associated with the access request;
mapping the partial address to a corresponding bit in a bloom filter array, wherein each bit indicates whether the partial address matches any cache line in the LLC; and
in response to the corresponding bit being set to true, determining the access request to be the LLC hit; otherwise, determining the access request to be the LLC miss.

6. The computer-implemented method of clause 5, further comprising:
in response to a determination of the access request being the LLC miss, setting a first bit in the bloom filter array to be true, the first bit being associated with the partial address associated with the requested memory line address.

7. The computer-implemented method of clause 5 or clause 6, wherein the partial address comprises least-significant p bits of the requested memory line address, p being greater than or equal to a number of index bits in the requested memory line address.

8. The computer-implemented method of clause 1 or clause 2, wherein determining whether the access request is the LLC hit or the LLC miss is performed by a machine learning based predictor.

9. The computer-implemented method of clause 1 or clause 2, wherein determining whether the access request is the LLC hit or the LLC miss comprises:
sending a query to the LLC according to the access request;
receiving a cache hit-or-miss status returned from the LLC in response to the query; and
determining whether the access request is the LLC hit or the LLC miss based on the received cache hit-or-miss status.

10. An apparatus, comprising:
at least one processor comprising:
multiple CPU cores comprising corresponding private caches;
a last level cache (LLC) shared by the multiple CPU cores, the last level cache being configured to receive an access request being sent from one of the multiple CPU core with the private cache holding copies of frequently accessed data from a memory external to the at least one processor;

a cache access predictor configured to determine whether the access request is an LLC hit or an LLC miss;

a memory bandwidth controller configured to perform memory bandwidth throttling to control a request rate between the private cache and the last level cache, the memory bandwidth controller being further configured to:

disable the memory bandwidth throttling initiated by the memory bandwidth controller in response to the determination of the access request being the LLC hit, and enable the memory bandwidth throttling initiated by the memory bandwidth controller in response to a determination of the access request being the LLC miss.

11. The apparatus of clause 10, wherein the cache access predictor is configured to determine whether the access request is the LLC hit or the LLC miss based on a requested memory line address associated with the access request, a request type associated with the access request, a data size associated with the access request, a source identifier associated with the access request, a destination identifier associated with the access request, or any combination thereof.

12. The apparatus of clause 10 or clause 11, wherein the cache access predictor is configured to determine whether the access request is the LLC hit or the LLC miss by:

splitting a requested memory line address associated with the access request into a plurality of partitioned addresses;

respectively mapping the plurality of partitioned addresses to corresponding entries in a plurality of bloom filter arrays, wherein each entry indicates a number of cache lines in the LLC including a corresponding partitioned address associated with the entry; and in response to one or more of the partitioned addresses being mapped to the entry with a zero value, determining the access request to be the LLC miss; otherwise, determining the access request to be the LLC hit.

13. The apparatus of clause 12, wherein in response to a determination of the access request being the LLC miss, the cache access predictor is configured to:

increment first entries in the bloom filter arrays, the first entries being associated with the partitioned addresses of the requested memory line address to be added to the LLC; and decrement second entries in the bloom filter arrays, the second entries being associated with second partitioned addresses of a replaced memory line address to be replaced by the requested memory line address.

14. The apparatus of clause 10 or clause 11, wherein the cache access predictor is configured to determine whether the access request is the LLC hit or the LLC miss by:

obtaining a partial address from a requested memory line address associated with the access request;

mapping the partial address to a corresponding bit in a bloom filter array, wherein each bit indicates whether the partial address matches any cache line in the LLC; and in response to the corresponding bit being set to true, determining the access request to be the LLC hit; otherwise, determining the access request to be the LLC miss.

15. The apparatus of clause 14, wherein in response to a determination of the access request being the LLC miss, the cache access predictor is configured to set a first bit in the bloom filter array to be true, the first bit being associated with the partial address associated with the requested memory line address.

16. The apparatus of clause 14 or clause 15, wherein the partial address comprises least-significant p bits of the requested memory line address, p being greater than or equal to a number of index bits in the requested memory line address.

17. The apparatus of clause 10 or clause 11, wherein the cache access predictor is a machine learning based predictor to determine whether the access request is the LLC hit or the LLC miss.

18. The apparatus of claim 10 or clause 11, wherein the cache access predictor is configured to determine whether the access request is the LLC hit or the LLC miss by:

sending a query to the LLC according to the access request;

receiving a cache hit-or-miss status returned from the LLC in response to the query; and determining whether the access request is the LLC hit or the LLC miss based on the received cache hit-or-miss status.

19. A non-transitory computer-readable storage medium storing a set of instructions that are executable by one or more processors of a device to cause the device to perform a method for allocating memory bandwidth, the method comprising:

receiving an access request to a last level cache (LLC) shared by multiple CPU cores in a server, the access request being sent from a core with a private cache holding copies of frequently accessed data from a memory;

determining whether the access request is an LLC hit or an LLC miss;

in response to a determination of the access request being the LLC hit, disabling a memory bandwidth throttling initiated by a memory bandwidth controller; and in response to a determination of the access request being the LLC miss, enabling the memory bandwidth throttling initiated by the memory bandwidth controller, wherein the memory bandwidth controller performs the memory bandwidth throttling to control a request rate between the private cache and the last level cache.

20. The non-transitory computer-readable storage medium of clause 19, wherein determining whether the access request is the LLC hit or the LLC miss comprises:

determining whether the access request is the LLC hit or the LLC miss based on a requested memory line address associated with the access request, a request type associated with the access request, a data size associated with the access request, a source identifier associated with the access request, a destination identifier associated with the access request, or any combination thereof.

21. The non-transitory computer-readable storage medium of clause 19 or clause 20, wherein determining whether the access request is the LLC hit or the LLC miss comprises:

splitting a requested memory line address associated with the access request into a plurality of partitioned addresses;

respectively mapping the plurality of partitioned addresses to corresponding entries in a plurality of bloom filter arrays, wherein each entry indicates a number of cache lines in the LLC including a corresponding partitioned address associated with the entry; and in response to one or more of the partitioned addresses being mapped to the entry with a zero value, determining the access request to be the LLC miss; otherwise, determining the access request to be the LLC hit.

22. The non-transitory computer-readable storage medium of clause 21, wherein the set of instructions that are executable by one or more processors of the device cause the device to further perform:

in response to a determination of the access request being the LLC miss:

incrementing first entries in the bloom filter arrays, the first entries being associated with the partitioned addresses of the requested memory line address to be added to the LLC; and decrementing second entries in the bloom filter arrays, the second entries being associated with second partitioned addresses of a replaced memory line address to be replaced by the requested memory line address.

23. The non-transitory computer-readable storage medium of clause 19 or clause 20, wherein determining whether the access request is the LLC hit or the LLC miss comprises:

obtaining a partial address from a requested memory line address associated with the access request;

mapping the partial address to a corresponding bit in a bloom filter array, wherein each bit indicates whether the partial address matches any cache line in the LLC; and in response to the corresponding bit being set to true, determining the access request to be the LLC hit; otherwise, determining the access request to be the LLC miss.

24. The non-transitory computer-readable storage medium of clause 23, wherein the set of instructions that are executable by one or more processors of the device cause the device to further perform:

in response to a determination of the access request being the LLC miss, setting a first bit in the bloom filter array to be true, the first bit being associated with the partial address associated with the requested memory line address.

25. The non-transitory computer-readable storage medium of clause 23 or clause 24, wherein the partial address comprises least-significant p bits of the requested memory line address, p being greater than or equal to a number of index bits in the requested memory line address.

26. The non-transitory computer-readable storage medium of clause 19 or clause 20, wherein determining whether the access request is the LLC hit or the LLC miss is performed by a machine learning based predictor.

27. The non-transitory computer-readable storage medium of clause 19 or clause 20, wherein determining whether the access request is the LLC hit or the LLC miss comprises:

sending a query to the LLC according to the access request;

receiving a cache hit-or-miss status returned from the LLC in response to the query; and determining whether the access request is the LLC hit or the LLC miss based on the received cache hit-or-miss status.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A computer-implemented method for allocating memory bandwidth of multiple CPU cores in a server, comprising:

receiving an access request to a last level cache (LLC) shared by the multiple CPU cores in the server, the access request being sent from a core with a private cache holding copies of frequently accessed data from a memory;

determining whether the access request is an LLC hit or an LLC miss based on a cache hit status or a miss status returned from the LLC in response to a query to the LLC according to the access request; and controlling a memory bandwidth controller based on the determination, wherein the memory bandwidth controller performs a memory bandwidth throttling to control a request rate between the private cache and the last level cache, and the LLC hit of the access request causes the memory bandwidth throttling initiated by the memory bandwidth controller to be disabled and the LLC miss of the access request causes the memory bandwidth throttling initiated by the memory bandwidth controller to be enabled.

2. The computer-implemented method of claim 1, wherein determining whether the access request is the LLC hit or the LLC miss comprises:

determining whether the access request is the LLC hit or the LLC miss based on a requested memory line address associated with the access request, a request type associated with the access request, a data size associated with the access request, a source identifier associated with the access request, a destination identifier associated with the access request, or any combination thereof.

3. The computer-implemented method of claim 1, wherein determining whether the access request is the LLC hit or the LLC miss comprises:

splitting a requested memory line address associated with the access request into a plurality of partitioned addresses;

respectively mapping the plurality of partitioned addresses to corresponding entries in a plurality of bloom filter arrays, wherein each entry indicates a number of cache lines in the LLC including a corresponding partitioned address associated with the entry; and in response to one or more of the partitioned addresses being mapped to the entry with a zero value, determining the access request to be the LLC miss; or in response to one or more of the partitioned addresses being mapped to the entry with a non-zero value, determining the access request to be the LLC hit.

4. The computer-implemented method of claim 3, further comprising:

in response to a determination of the access request being the LLC miss:

incrementing first entries in the bloom filter arrays, the first entries being associated with the partitioned addresses of the requested memory line address to be added to the LLC; and decrementing second entries in the bloom filter arrays, the second entries being associated with second partitioned addresses of a replaced memory line address to be replaced by the requested memory line address.

5. The computer-implemented method of claim 1, wherein determining whether the access request is the LLC hit or the LLC miss comprises:

obtaining a partial address from a requested memory line address associated with the access request;

mapping the partial address to a corresponding bit in a bloom filter array, wherein each bit indicates whether the partial address matches any cache line in the LLC; and in response to the corresponding bit being set to true, determining the access request to be the LLC hit; or in response to the corresponding bit being set to false, determining the access request to be the LLC miss.

6. The computer-implemented method of claim 5, further comprising:

in response to a determination of the access request being the LLC miss, setting a first bit in the bloom filter array to be true, the first bit being associated with the partial address associated with the requested memory line address.

7. The computer-implemented method of claim 5, wherein the partial address comprises least-significant p bits of the requested memory line address, p being greater than or equal to a number of index bits in the requested memory line address.

8. The computer-implemented method of claim 1, wherein determining whether the access request is the LLC hit or the LLC miss is performed by a machine learning based predictor.

9. The computer-implemented method of claim 1, wherein determining whether the access request is the LLC hit or the LLC miss comprises:

sending the query to the LLC according to the access request;

receiving the cache hit status or the miss status returned from the LLC in response to the query.

10. An apparatus, comprising:

at least one processor comprising:

multiple CPU cores comprising corresponding private caches;

a last level cache (LLC) shared by the multiple CPU cores, the last level cache being configured to receive an access request being sent from one of the multiple CPU cores with the private cache holding copies of frequently accessed data from a memory external to the at least one processor;

a cache access predictor configured to determine whether the access request is an LLC hit or an LLC miss based on a cache hit status or a miss status returned from the LLC in response to a query to the LLC according to the access request;

a memory bandwidth controller configured to perform memory bandwidth throttling to control a request rate between the private cache and the last level cache, the memory bandwidth controller being further configured to:

disable the memory bandwidth throttling initiated by the memory bandwidth controller in response to the determination of the access request being the LLC hit, and enable the memory bandwidth throttling initiated by the memory bandwidth controller in response to a determination of the access request being the LLC miss.

11. The apparatus of claim 10, wherein the cache access predictor is configured to determine whether the access request is the LLC hit or the LLC miss based on a requested memory line address associated with the access request, a request type associated with the access request, a data size associated with the access request, a source identifier associated with the access request, a destination identifier associated with the access request, or any combination thereof.

12. The apparatus of claim 10, wherein the cache access predictor is configured to determine whether the access request is the LLC hit or the LLC miss by:

splitting a requested memory line address associated with the access request into a plurality of partitioned addresses;

respectively mapping the plurality of partitioned addresses to corresponding entries in a plurality of bloom filter arrays, wherein each entry indicates a number of cache lines in the LLC including a corresponding partitioned address associated with the entry; and in response to one or more of the partitioned addresses being mapped to the entry with a zero value, determining the access request to be the LLC miss; and in response to one or more of the partitioned addresses being mapped to the entry with a non-zero value, determining the access request to be the LLC hit.

13. The apparatus of claim 12, wherein in response to a determination of the access request being the LLC miss, the cache access predictor is configured to:

increment first entries in the bloom filter arrays, the first entries being associated with the partitioned addresses of the requested memory line address to be added to the LLC; and decrement second entries in the bloom filter arrays, the second entries being associated with second partitioned addresses of a replaced memory line address to be replaced by the requested memory line address.

14. The apparatus of claim 10, wherein the cache access predictor is configured to determine whether the access request is the LLC hit or the LLC miss by:

obtaining a partial address from a requested memory line address associated with the access request;

mapping the partial address to a corresponding bit in a bloom filter array, wherein each bit indicates whether the partial address matches any cache line in the LLC; and in response to the corresponding bit being set to true, determining the access request to be the LLC hit; and in response to the corresponding bit being set to false, determining the access request to be the LLC miss.

15. The apparatus of claim 14, wherein in response to a determination of the access request being the LLC miss, the cache access predictor is configured to set a first bit in the bloom filter array to be true, the first bit being associated with the partial address associated with the requested memory line address.

16. The apparatus of claim 14, wherein the partial address comprises least-significant p bits of the requested memory line address, p being greater than or equal to a number of index bits in the requested memory line address.

17. The apparatus of claim 10, wherein the cache access predictor is a machine learning based predictor to determine whether the access request is the LLC hit or the LLC miss.

18. The apparatus of claim 10, wherein the cache access predictor is configured to determine whether the access request is the LLC hit or the LLC miss by:
sending the query to the LLC according to the access request;
receiving the cache hit status or the miss status returned from the LLC in response to the query.

19. A non-transitory computer-readable storage medium storing a set of instructions that are executable by one or more processors of a device to cause the device to perform a method for allocating memory bandwidth, the method comprising:
receiving an access request to a last level cache (LLC) shared by multiple CPU cores in a server, the access request being sent from a core with a private cache holding copies of frequently accessed data from a memory;
determining whether the access request is an LLC hit or an LLC miss based on a cache hit status or a miss status returned from the LLC in response to a query to the LLC according to the access request;
in response to a determination of the access request being the LLC hit, disabling a memory bandwidth throttling initiated by a memory bandwidth controller; and
in response to a determination of the access request being the LLC miss, enabling the memory bandwidth throttling initiated by the memory bandwidth controller, wherein the memory bandwidth controller performs the memory bandwidth throttling to control a request rate between the private cache and the last level cache.

20. The non-transitory computer-readable storage medium of claim 19, wherein determining whether the access request is the LLC hit or the LLC miss comprises:
determining whether the access request is the LLC hit or the LLC miss based on a requested memory line address associated with the access request, a request type associated with the access request, a data size associated with the access request, a source identifier associated with the access request, a destination identifier associated with the access request, or any combination thereof.

* * * * *